(No Model.)
M. N. LAUFENBURG.
HEADER.
No. 246,157. Patented Aug. 23, 1881.
Fig. 1.
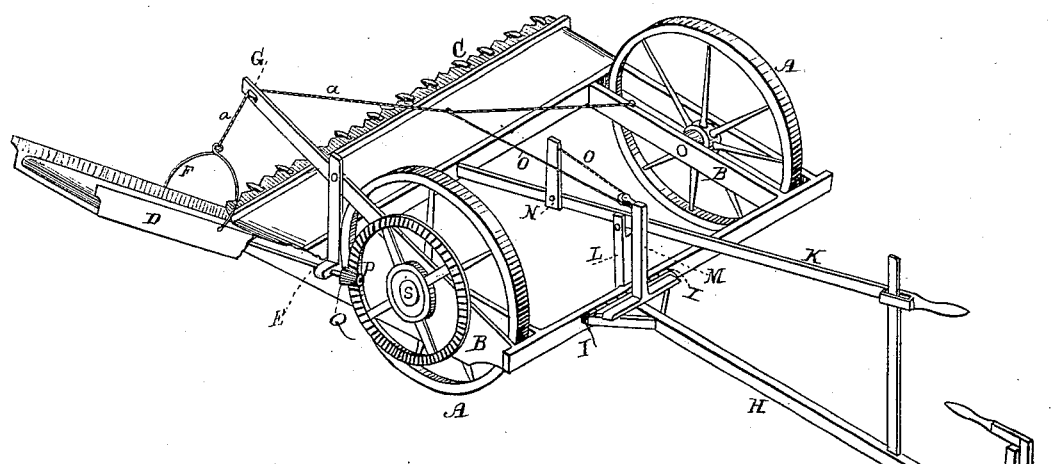
Fig. 2. Fig. 3.
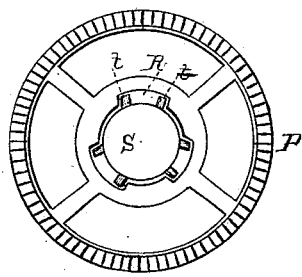
Fig. 4. Fig. 5.
Witnesses
Geo. H. Strong.
Frank A. Brooks
Inventor
Michael N. Laufenburg
By Dewey & Co.
Attys

UNITED STATES PATENT OFFICE.

MICHAEL N. LAUFENBURG, OF SAN FRANCISCO, CALIFORNIA, ASSIGNOR TO BAKER & HAMILTON, OF SAME PLACE.

HEADER.

SPECIFICATION forming part of Letters Patent No. 246,157, dated August 23, 1881.

Application filed September 30, 1880. (No model.)

*To all whom it may concern:*

Be it known that I, MICHAEL N. LAUFENBURG, of the city and county of San Francisco, State of California, have invented an Improvement in Headers; and I hereby declare the following to be a full, clear, and exact description thereof.

My invention relates to certain improvements in that class of apparatus employed for harvesting grain known as "headers;" and it consists in the combination of devices hereinafter described and claimed.

A difficulty arises when the driving-gear is secured rigidly to the axle, on account of the end-play of the parts, which often breaks the gear by its forcible contact with the pinion. I overcome this by a peculiar method of securing the gear to the hub, so that while forced to revolve with the wheel it will be allowed side-play sufficient to relieve it of this strain.

Referring to the accompanying drawings for a more complete explanation of my invention, Figure 1 is a view of my invention, showing devices not claimed in this application, but added as a matter of explanation. Fig. 2 is an enlarged view of the gear-wheel. Figs. 3, 4, and 5 are details of construction.

A A are the bearing-wheels of a header.

The bevel driving-gear P, which meshes with and drives the pinion Q and the sickle crank-shaft, is usually rigidly keyed or secured to the outer end of the axle of the wheel upon that side, and the end-play crowds it against the pinion, so as to often break it or create great friction.

In my invention I form the gear-wheel with a large central opening, shaped as shown at R. The hub S, which is keyed to or formed with the axle, is made with points or projections $t$, and these fit into the angles of the wheel-opening, so that the revolution of the axle will drive the wheel, while the latter is allowed sufficient side movement to accommodate itself to the irregular end-play of the axle, and thus relieve it of the pressure against the pinion, which might break it.

Outside the wheel and hub is a flange, U, which is secured to the inner part of the hub by bolts $v$, which pass through the spaces formed around the hub between the projections $t$, as shown. This flange retains the wheel in place.

I do not claim the improvement in counterbalancing headers, as this will be made the subject of another application.

Having thus described my invention, what I claim as new, and desire to secure by Letters Patent, is—

The main axle provided with the enlarged hub S, having the double sets of pins $t$, in combination with the wheel P, provided with the spaces R, plates U, and bolts $v$, all constructed substantially as and for the purpose herein set forth.

In witness whereof I have hereunto set my hand.

MICHAEL N. LAUFENBURG.

Witnesses:
S. H. NOURSE,
FRANK A. BROOKS.